(12) United States Patent
Garcia

(10) Patent No.: US 9,014,358 B2
(45) Date of Patent: Apr. 21, 2015

(54) CONFERENCED VOICE TO TEXT TRANSCRIPTION

(75) Inventor: Juan Martin Garcia, Mississauga (CA)

(73) Assignee: BlackBerry Limited, Waterloo, Ontario (CA)

(*) Notice: Subject to any disclaimer, the term of this patent is extended or adjusted under 35 U.S.C. 154(b) by 198 days.

(21) Appl. No.: 13/223,652

(22) Filed: Sep. 1, 2011

(65) Prior Publication Data

US 2013/0058471 A1    Mar. 7, 2013

(51) Int. Cl.
  *H04M 3/42* (2006.01)
  *H04M 11/00* (2006.01)
  *H04M 1/00* (2006.01)
  *H04L 12/16* (2006.01)
  *H04Q 11/00* (2006.01)
  *G10L 15/26* (2006.01)
  *H04M 3/56* (2006.01)

(52) U.S. Cl.
  CPC ...... *H04M 3/42221* (2013.01); *H04M 2203/50* (2013.01); *H04M 3/56* (2013.01); *H04M 2201/40* (2013.01); *G10L 15/265* (2013.01)

(58) Field of Classification Search
  CPC ......... H04M 3/42; H04M 3/56; H04M 3/564; H04M 3/565; H04M 3/566; H04M 3/567; H04M 3/568; H04M 3/42221; H04M 7/006; H04N 7/14; H04N 7/15; H04N 7/141; H04N 7/142; H04N 7/144; H04N 7/146; H04N 7/147; H04N 7/148; H04N 7/152; H04N 7/155; H04N 7/157; H04L 12/18
  USPC ........ 379/88.14, 88.22, 202.01, 90.01, 93.01, 379/93.21, 157, 158, 201.01, 207.01; 704/235; 455/416, 414.1; 370/260, 370/261, 259, 262
  See application file for complete search history.

(56) References Cited

U.S. PATENT DOCUMENTS

| | | | | |
|---|---|---|---|---|
| 3,622,791 | A * | 11/1971 | Bernard | 250/231.19 |
| 5,185,789 | A * | 2/1993 | Hanon et al. | 379/395 |
| 5,960,447 | A * | 9/1999 | Holt et al. | 704/235 |
| 6,222,909 | B1 * | 4/2001 | Qua et al. | 379/88.22 |
| 6,334,025 | B1 * | 12/2001 | Yamagami | 386/241 |
| 6,618,704 | B2 | 9/2003 | Kanevsky et al. | |
| 6,674,459 | B2 | 1/2004 | Ben-Shachar et al. | |
| 6,816,468 | B1 | 11/2004 | Cruickshank | |

(Continued)

FOREIGN PATENT DOCUMENTS

EP    1798945    6/2007

OTHER PUBLICATIONS

Extended European Search Report mailed Feb. 13, 2012, for European Application No. 11179790.8.

(Continued)

*Primary Examiner* — Khai N Nguyen
(74) *Attorney, Agent, or Firm* — Fish & Richardson P.C.

(57) ABSTRACT

Presented are systems and methods for creating a transcription of a conference call. The system joins an audio conference call with a device associated with a participant, of a plurality of participants joined to the conference through one or more associated devices. The system then creates a speech audio file corresponding to a portion of the participant's speech during the conference and converting contemporaneously, at the device, the speech audio file to a local partial transcript. The system then acquires a plurality of partial transcripts from at least one of the associated devices, so that the device can provide a complete transcript.

20 Claims, 8 Drawing Sheets

(56) References Cited

U.S. PATENT DOCUMENTS

| | | |
|---|---|---|
| 6,850,609 B1 | 2/2005 | Schrage |
| 7,133,513 B1 | 11/2006 | Zhang |
| 7,383,182 B2 | 6/2008 | Taylor |
| 7,664,775 B2 * | 2/2010 | Reed et al. ............... 707/706 |
| 7,756,923 B2 | 7/2010 | Caspi et al. |
| 2006/0293888 A1 * | 12/2006 | Jindal ....................... 704/235 |
| 2007/0136450 A1 * | 6/2007 | Nikiforou ................. 709/223 |
| 2007/0188599 A1 | 8/2007 | Kenoyer |
| 2008/0227438 A1 * | 9/2008 | Fletcher .................... 455/416 |
| 2009/0048845 A1 * | 2/2009 | Burckart et al. ........... 704/270 |
| 2009/0103459 A1 * | 4/2009 | Wilson ...................... 370/271 |
| 2009/0119371 A1 * | 5/2009 | Chang et al. ............... 709/206 |
| 2009/0135741 A1 | 5/2009 | Mykhalchuk et al. |
| 2009/0220058 A1 * | 9/2009 | Nikiforou ................ 379/88.14 |
| 2009/0287547 A1 * | 11/2009 | Scanlon ...................... 705/10 |
| 2009/0326939 A1 | 12/2009 | Toner et al. |
| 2010/0063815 A1 | 3/2010 | Cloran et al. |
| 2010/0076747 A1 | 3/2010 | Appleyard et al. |
| 2010/0158203 A1 | 6/2010 | Mikan et al. |
| 2010/0217836 A1 * | 8/2010 | Rofougaran ............... 709/218 |
| 2011/0037827 A1 * | 2/2011 | Aoki et al. ................. 348/14.01 |
| 2011/0112833 A1 * | 5/2011 | Frankel et al. ............. 704/235 |
| 2012/0066592 A1 * | 3/2012 | Issa et al. .................. 715/716 |

OTHER PUBLICATIONS

Office Action mailed by the Canadian Patent Office in corresponding Canadian application No. 2,784,090, dated May 29, 2014, 3 pgs.

Communication Pursuant to Article 94(3) mailed by the European Patent Office in corresponding European application No. 11 179 790.8—1972, dated Jul. 17, 2014, 4 pgs.

* cited by examiner

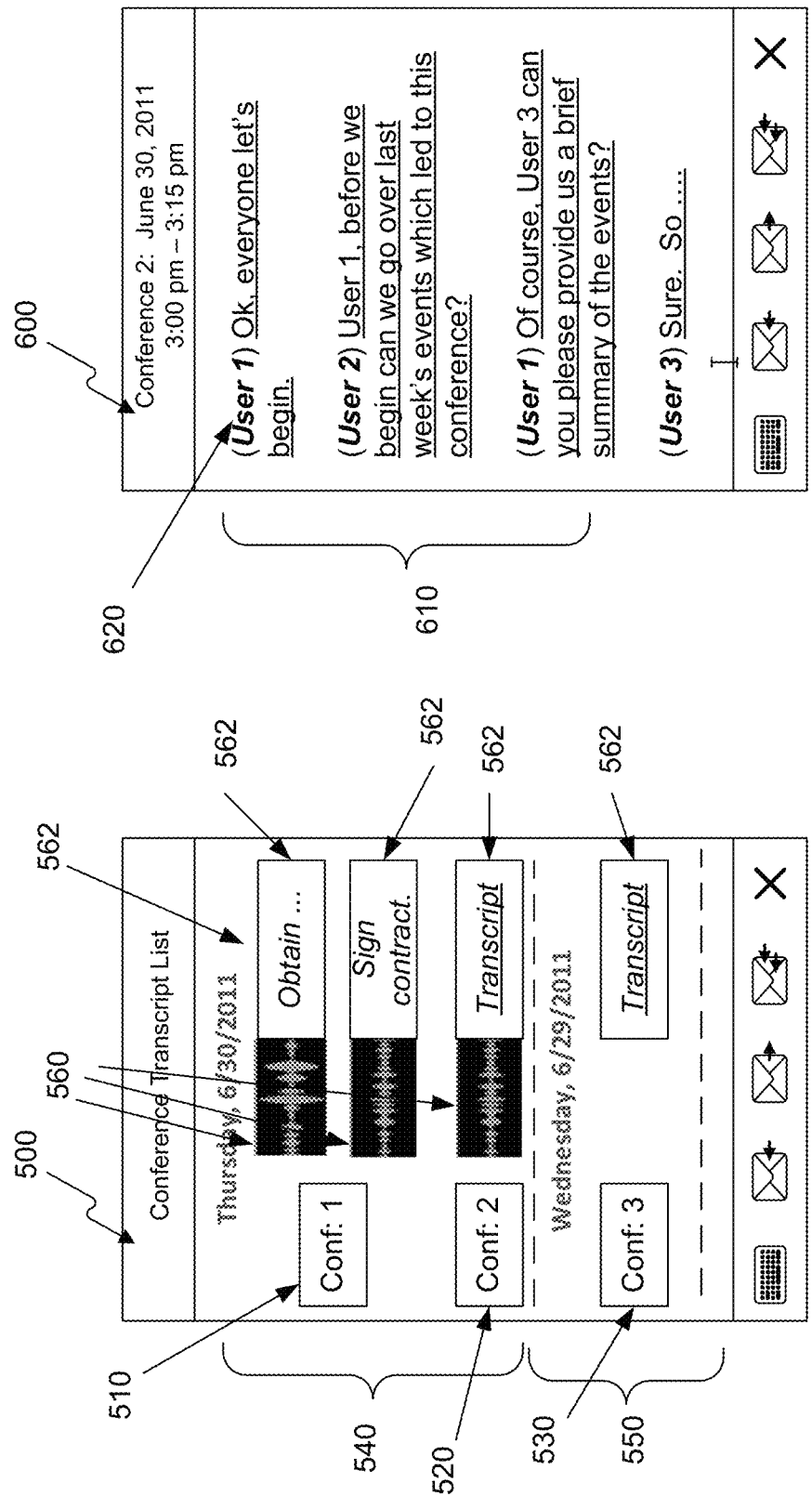

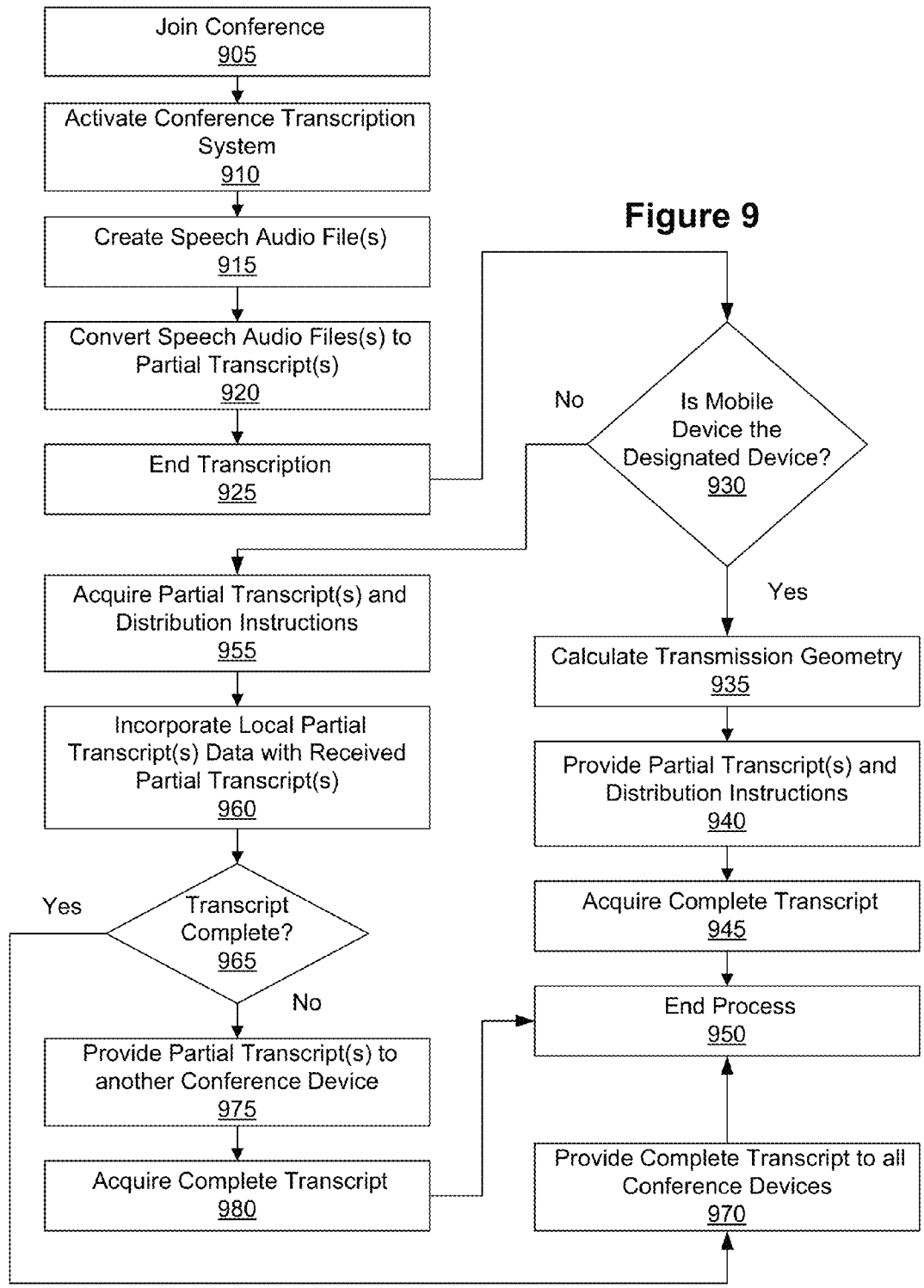

CONFERENCED VOICE TO TEXT TRANSCRIPTION

FIELD

Example embodiments relate to transcription systems and methods, and in particular to a method for transcribing conference calls.

BACKGROUND

In general, human note takers are often used to take notes during conference calls. But manual note transcription comes with a number of problems. First, small businesses often cannot afford to hire people specifically to take notes. Secondly, human note takers can become overwhelmed as the size of the conference call increases and it can become challenging, if not impossible, for human note takers to re-create an exact transcript of the data file. Moreover, as the size of the business increases, note takers can represent a large overhead cost.

Currently, one method for automating note taking is simply to provide an audio recording to the conference call. In some cases, however, some, if not most, of the information provided is not needed by all the conference participants, thus, creating a large audio transcript of the conference that is largely useless to many of the conference participants.

In some methods, the entire conference call is transcribed to a purely textual transcript. But pure text sometimes does not reflect the nuances of speech that can change the intended meaning of the text. Additionally, the size of the transcript can become quite large if one is created for the entire conference.

BRIEF DESCRIPTION OF THE DRAWINGS

Reference will now be made to the accompanying drawings showing example embodiments of the present application, and in which:

FIG. 5 illustrates an example conference transcript list graphic user interface;

FIG. 6 illustrates an example conference record graphic user interface;

FIG. 9 shows a flowchart representing an example method transcribing conference data that shares transcript processing among conference devices.

DESCRIPTION OF EXAMPLE EMBODIMENTS

The example embodiments provided below describe a transcription device, computer readable medium, and method for joining an audio conference call with a device associated with a participant, of a plurality of participants joined to the conference through one or more associated devices. The method creates a speech audio file corresponding to a portion of the participant's speech during the conference and converts contemporaneously, at the device, the speech audio file to a local partial transcript. Additionally, the method acquires a plurality of partial transcripts from at least one of the associated devices, so that the device can provide a complete transcript.

Types of transcripts can include partial, complete, audio, text, linked, or any combination thereof. A partial transcript can embody a particular transcribed segment of the conference that corresponds to a particular user. When the partial transcripts from all conference participants are collected and arranged in chronological order, a complete transcript is created. In a linked transcript, portions of the text are mapped to the corresponding recorded audio, such that a user can read the text of the transcript or listen to the corresponding audio recording from which the text was created.

Figure 1:
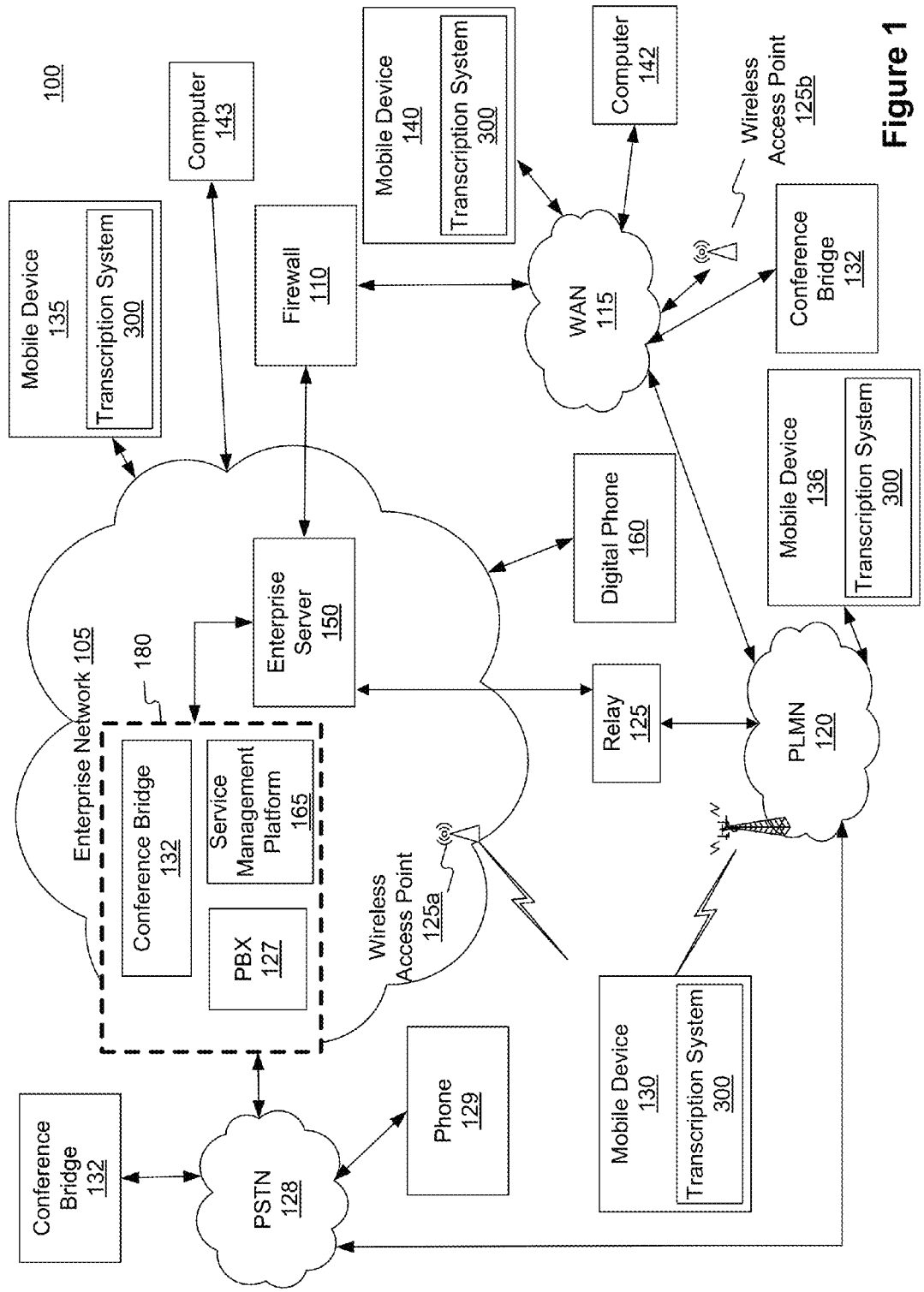
FIG. 1 shows, in block diagram form, an example system utilizing a conference call scheduling system.

Reference is now made to FIG. 1, which shows, in block diagram form, an example system 100 utilizing a transcription system for creating transcripts of conference calls. System 100 includes an enterprise network 105, which in some embodiments includes a local area network (LAN). In some embodiments, enterprise network 105 can be an enterprise or business system. In some embodiments, enterprise network 105 includes more than one network and is located in multiple geographic areas.

Enterprise network 105 is coupled, often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks (not shown).

Enterprise network 105 can also communicate with a public land mobile network (PLMN) 120, which is also referred to as a wireless wide area network (WWAN) or, in some cases, a cellular network. The connection with PLMN 120 is via a relay 125.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown in FIG. 1).

System 100 can include a number of enterprise-associated mobile devices, for example, mobile devices 130, 135, 136, and 140. Mobile devices 130, 135, 136, and 140 can include devices equipped for cellular communication through PLMN 120, mobile devices equipped for Wi-Fi communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications.

Mobile devices 130, 135, 136, and 140 can be, for example, cellular phones, smartphones, tablets, netbooks, and PDAs (personal digital assistants) enabled for wireless communication. Moreover, mobile devices 130, 135, 136, and 140 can communicate with other components using voice communications or data communications (such as accessing content from a website). Mobile devices 130, 135, 136, and 140 include devices equipped for cellular communication through PLMN 120, devices equipped for Wi-Fi communications via wireless access points 125a or 125b, or dual-mode devices capable of both cellular and WLAN communications. Mobile devices 130, 135, 136, and 140 are described in more detail below in FIG. 2.

Mobile devices 130, 135, 136, and 140 also include one or more radio transceivers and associated processing hardware and software to enable wireless communications with PLMN 120, and/or one of the WLANs via wireless access points 125*a* or 125*b*. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, 3GPP, or a variety of others. It will be appreciated that mobile devices 130, 135, 136, and 140 can roam within PLMN 120 and across PLMNs, in known manner, as their user moves. In some instances, dual-mode mobile devices 130, 135, 136, and 140 and/or enterprise network 105 are configured to facilitate roaming between PLMN 120 and a wireless access points 125*a* or 125*b*, and are thus capable of seamlessly transferring sessions (such as voice calls) from a connection with the cellular interface of dual-mode device 130, 135, 136, and 140 to a WLAN interface of the dual-mode device, and vice versa.

Enterprise network 105 typically includes a number of networked servers, computers, and other devices. For example, enterprise network 105 can connect one or more desktop or laptop computers 143 (one shown). The connection can be wired or wireless in some embodiments. Enterprise network 105 can also connect to one or more digital telephone phones 160.

Relay 125 serves to route messages received over PLMN 120 from mobile device 130 to corresponding enterprise network 105. Relay 125 also pushes messages from enterprise network 105 to mobile device 130 via PLMN 120.

Enterprise network 105 also includes an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

As is typical in many enterprises, enterprise network 105 includes a Private Branch eXchange (although in various embodiments the PBX can be a standard PBX or an IP-PBX, for simplicity the description below uses the term PBX to refer to both) 127 having a connection with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched connections through PSTN 128 and related signaling and communications. In some embodiments, PBX 127 can be coupled to one or more conventional analog telephones 129. PBX 127 is also coupled to enterprise network 105 and, through it, to telephone terminal devices, such as digital telephone sets 160, softphones operating on computers 143, etc. Within the enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are often packet-switched calls, for example Voice-over-IP (VoIP) calls.

System 100 includes one or more conference bridges 132. The conference bridge 132 can be part of the enterprise network 105. Additionally, in some embodiments, the conference bridge 132 can be accessed via WAN 115 or PTSN 128.

Enterprise network 105 can further include a Service Management Platform (SMP) 165 for performing some aspects of messaging or session control, like call control and advanced call processing features. Service Management Platform (SMP) can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. SMP 165 can be configured to group a plurality of received partial transcripts by conference, assemble the grouped partial transcripts in chronological order to create a complete transcript of the conference.

Collectively SMP 165, conference bridge 132, and PBX 127 are referred to as the enterprise communications platform 180. It will be appreciated that enterprise communications platform 180 and, in particular, SMP 165, is implemented on one or more servers having suitable communications interfaces for connecting to and communicating with PBX 127, conference bridge 132, and DID/PRI trunks. Although SMP 165 can be implemented on a stand-alone server, it will be appreciated that it can be implemented into an existing control agent/server as a logical software component.

Mobile device 130, for example, has a transcription system 300 and is in communication with enterprise network 105. Transcription system 300 can include one or more processors (not shown), a memory (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Transcription system 300 can be implemented on a mobile device, a computer (for example, computer 142 or computer 132), a digital phone 160, distributed across a plurality of computers, or some combination thereof. For example, in some embodiments (not shown) transcription system 300 can be distributed across mobile devices 130, 135, 136, and 140 and SMP 165.

Figure 2:
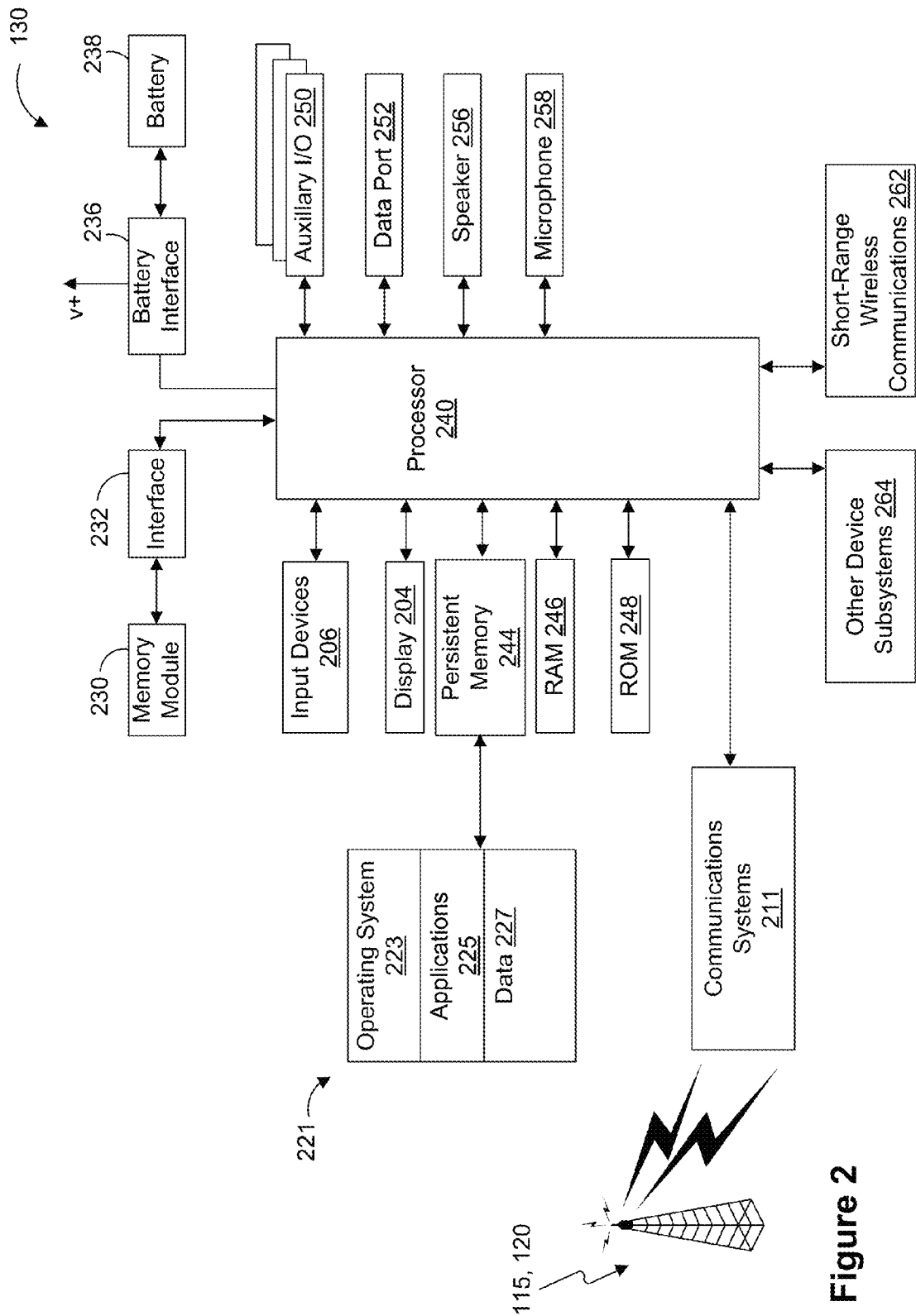
FIG. 2 shows a block diagram illustrating a mobile communication device in accordance with an example embodiment.

Reference is now made to FIG. 2 which illustrates in detail mobile device 130 in which example embodiments can be applied. Note that while FIG. 2 is described in reference to mobile device 130, it also applies to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a netbook, a gaming console, a tablet, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as a communication systems 211 for exchanging radio frequency signals with the wireless network (for example WAN 115 and/or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (for example, RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller.

Communication systems 211 includes one or more communication systems for communicating with wireless WAN 115 and wireless access points 125a and 125b within the wireless network. The particular design of communication systems 211 depends on the wireless network in which mobile device 130 is intended to operate. Mobile device 130 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including, one or more conference dial-in telephone numbers. Persistent memory 244 can additionally store identifiers related to particular conferences. Persistent memory 244 can also store information relating to various people, for example, name of a user, a user's identifier (user name, email address, or any other identifier), place of employment, work phone number, home address, etc. Persistent memory 244 can also store one or more speech audio files, one or more partial transcripts, one or more complete conference transcripts, a speech-to-text database, one or more voice templates, one or more translation applications, or any combination thereof. Each partial transcript has an associated date/time stamp, conference identifier, and speaker identifier. Speech-to-text database includes information that can be used by transcription system 300 to convert a speech audio file into text. In some embodiments, the one or more voice templates can be used to provide voice recognition functionality to transcription system 300. Likewise, in some embodiments, the one or more translation applications can be used by transcription system 300 to create a transcript of a conference in a language that is different from a language spoken in the original audio recording of the conference.

Software modules 221, for example, transcription system 300, or parts thereof can be temporarily loaded into volatile memory such as RAM 246. RAM 246 is used for storing runtime data variables and other types of data or information. In some embodiments, different assignment of functions to the types of memory could also be used. In some embodiments, software modules 221 can include a speech-to-text module. The speech-to-text module can convert a speech audio file into text, translate speech into one or more languages, perform voice recognition, or some combination thereof.

Software applications 225 can further include a range of applications, including, for example, an application related to transcription system 300, e-mail messaging application, address book, calendar application, notepad application, Internet browser application, voice communication (i.e., telephony) application, mapping application, or a media player application, or any combination thereof. Each of software applications 225 can include layout information defining the placement of particular fields and graphic elements (for example, text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module (SIM). Memory module 230 is inserted in or coupled to memory module interface 232 of mobile device 130 in order to operate in conjunction with the wireless network. Additionally, in some embodiments the speech-to-text functionality can be augmented via data stored on one or more memory modules 230. For example, the memory modules can contain speech-to-text data specific to particular topics, like law, medicine, engineering, etc. Thus, in embodiments where mobile device 130 performs the speech-to-text conversion locally, transcription system 300 can use data on memory modules 130 to increase the accuracy of the speech-to-text conversion. Similarly, one or more memory modules 130 can contain one or more translation databases specific to different languages, thus augmenting the capability of transcription system 300 in the speech-to-text conversion and potential translation of different languages into one language. For example, the conference could take place in Chinese and English and transcription system can produce a single transcript in English. Additionally, in some embodiments, transcription system can produce multiple transcripts in different languages. For example, the Chinese speaker would receive a transcript in Chinese and the English speaker a transcript in English. Additionally, in some embodiments speakers can receive all the transcripts produced. For example, both the English and the Chinese speaker would receive the Chinese and the English transcripts. Additionally, in some embodiments, one or more memory modules 130 can contain one or more voice templates that can be used by transcription system 300 for voice recognition.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can also include, for example, scheduling and connection information for connecting to a scheduled call. Data 227 can include transcription system data used by mobile device 130 for various tasks. Data 227 can include speech audio files generated by the user of mobile device 130 as the user participates in the conference. For example, if the user says "I believe that this project should be handled by Jill", transcription system 300 can record this statement in a speech audio file. The speech audio file has a particular date/time stamp, a conference identifier, and a speaker identifier. In some embodiments, data 227 can include an audio recording of the entire conference. Data 227 can also include various types of transcripts. For example, types of transcripts can include partial, complete, audio, text, linked, or any combination thereof.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range communication subsystem 262 is an additional optional component that provides for communication between mobile device 130 and different systems or devices, which need not necessarily be similar devices. For example, short-range communication subsystem 262 can include an infrared device and associated circuits and components, or a wireless bus protocol compliant communication device such as a BLUETOOTH® communication module to provide for communication with similarly-enabled systems and devices.

A predetermined set of applications that control basic device operations, including data and possibly voice communication applications, can be installed on mobile device 130 during or after manufacture. Additional applications and/or upgrades to operating system software 223 or software applications 225 can also be loaded onto mobile device 130 through the wireless network (for example WAN 115 and/or PLMN 120), auxiliary I/O subsystem 250, data port 252, short-range communication subsystem 262, or other suitable subsystem such as 264. The downloaded programs or code modules can be permanently installed, for example, written into the program memory (for example persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file are processed by communication systems 211 and input to processor 240 for further processing. For example, a downloaded Web page can be further processed by a browser application, or an e-mail message can be processed by an e-mail message messaging application and output to display 204. A user of mobile device 130 can also compose data items, such as e-mail messages, for example, using the input devices in conjunction with display 204. These composed items can be transmitted through communication systems 211 over the wireless network (for example WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras (not shown) to capture video of video teleconference.

Figure 3:
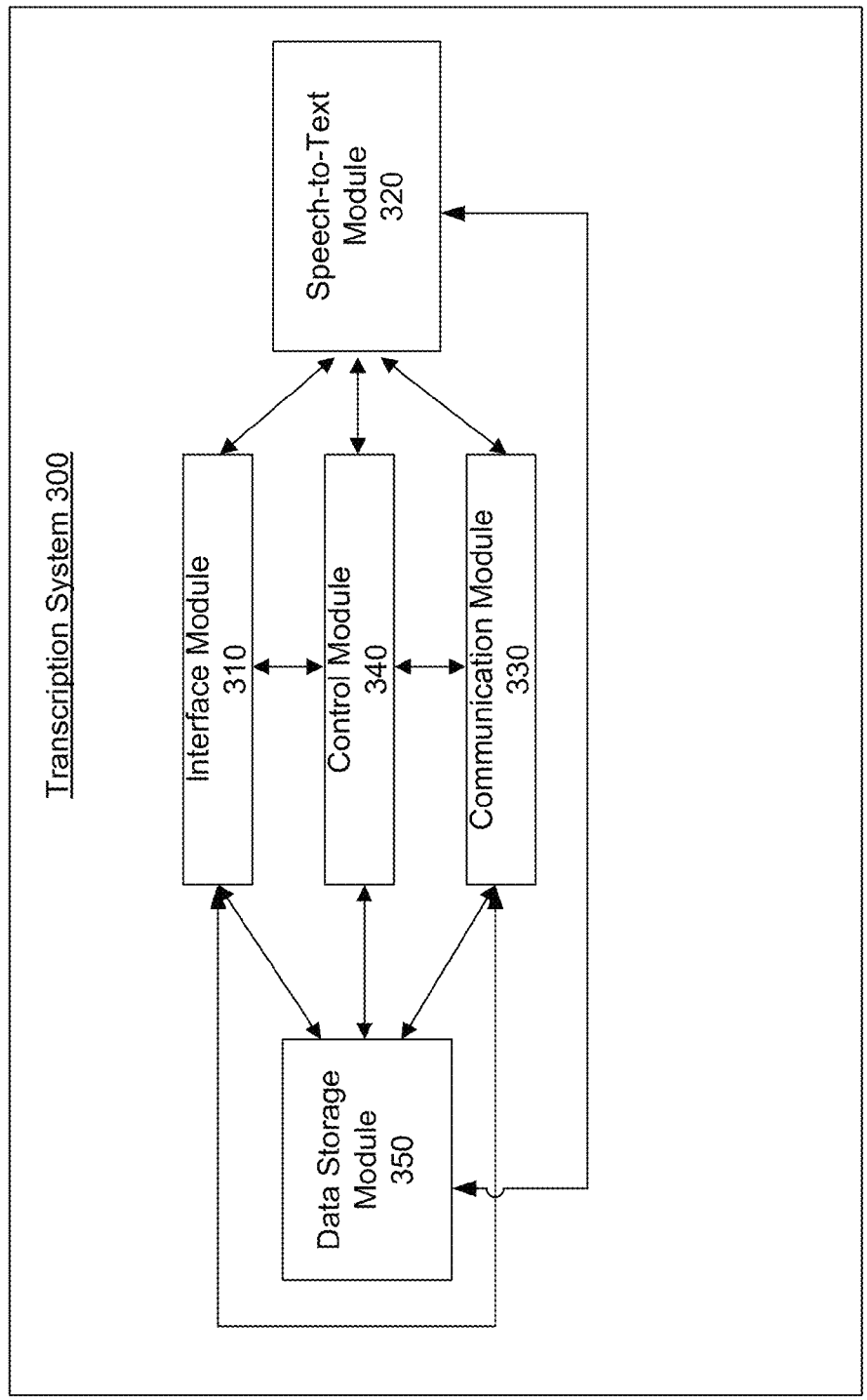
FIG. 3 is a block diagram depicting example transcription system in a conference call.

FIG. 3 is a block diagram depicting an example transcription system 300. As illustrated, transcription system 300 includes an interface module 310, a speech-to-text module 320, a communication module 330, a control module 340, and a data storage module 350. It is appreciated that one or more of these modules can be deleted, modified, or combined together with other modules.

Figure 4:
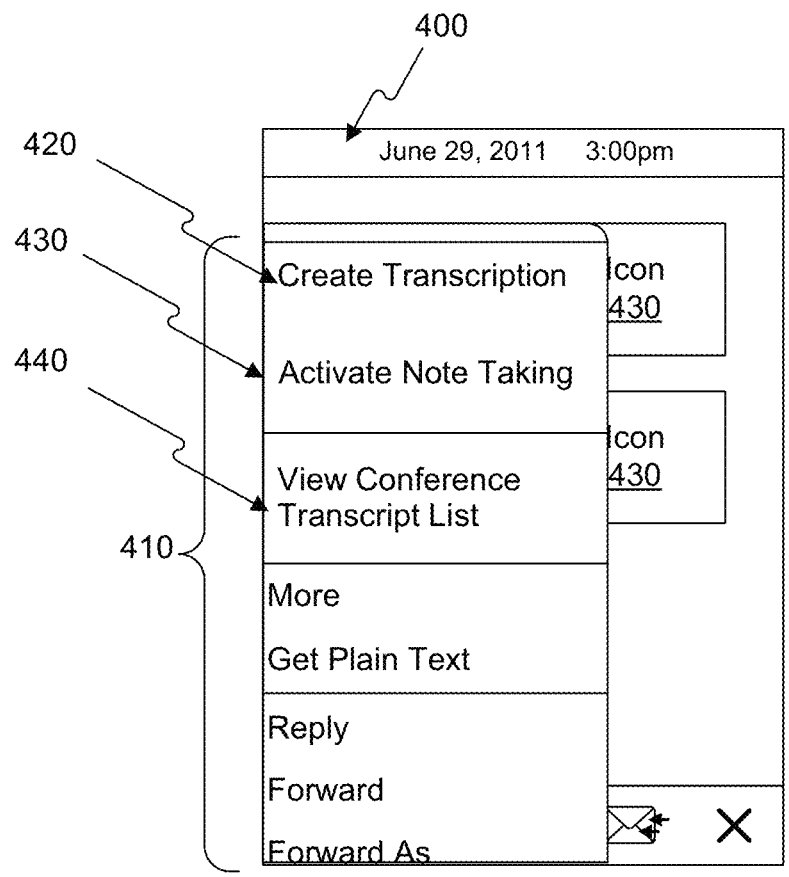
FIG. 4 illustrates an example graphical user interface being displayed on the display of the mobile device.

FIG. 4 illustrates an example graphical user interface being displayed (for example via interface module 310) on the display of the mobile device. Menu 410 can be accessed from the desktop of a mobile device (for example, mobile device 130). In some embodiments, menu 410 can be accessed via an actual button on the mobile device. In some embodiments, menu 410 can be accessed when one or more applications are active. Menu 410 can contain a plurality of commands, including create transcription command 420, activate note taking command 430, and view conference transcript list command 440.

Selecting create transcription command 420 triggers the execution of transcription system 300 (for example via interface module 310). Create transcription command 420 can be executed before, during, or after mobile device 130 participates in the conference call. The conference control can be an audio teleconference or a video teleconference. When activated, create transcription command 420 causes the transcription system 300 to automatically enter a mode of operation that creates speech audio files of anything the user of mobile device 130 says while mobile device is coupled to the conference. Transcription system 300 can start recording when it detects the user speaking and can cease recording when no speech is detected for a predetermined time. Transcription system 300 can then store the recorded speech as a speech audio file. Each speech audio file created has a date/time stamp, a conference identifier, and a speaker identifier. The date/time stamp provides the date and time when the speech audio file was created. The conference identifier associates the speech audio file to its corresponding conference. The speaker identifier associates the speech audio file with the speaker. The speaker identifier can be the name of a user, a user's identifier (user name, email address, or any other identifier), work phone number, etc. Additionally, in some embodiments, if the mobile device is participating in a video teleconference, the created speech audio file also has an associated video component. The associated video component can be part of the speech audio file, or a separate video file corresponding to the speech audio file.

Selecting activate note taking command 430 triggers the execution of transcription system 300 (for example via interface module 310). Note taking command 430 can be executed before or during mobile device 130's participation in the conference call. When activated, note taking command 430 causes transcription system 300 to automatically enter a mode of operation that creates speech audio files in response to specific key words said by the user. For example, if the user says "ACTION ITEM Jim's letter to counsel needs to be revised." Transcription system 300 would then create a speech audio file containing a recording of the speech after the key words, "Jim's letter to counsel needs to be revised." Key words can include, for example, "ACTION ITEM," "CREATE TRANSCRIPT," "OFF THE RECORD," "END TRANSCRIPT," etc. Each speech audio file created has a date/time stamp, a conference identifier, and a speaker identifier. The date/time stamp provides the date and time when the speech audio file was created. The conference identifier associates the speech audio file to its corresponding conference. The speaker identifier associates the speech audio file with the speaker. The speaker identifier can be the name of a user, a user's identifier (user name, email address, or any other identifier), work phone number, etc.

For example, the key word "ACTION ITEM" causes transcription system 300 to create a speech audio file of the user's statement immediately following the key words. The key words "CREATE TRANSCRIPT" allows the user to verbally activate create transcription command 420 during the conference. The key words "OFF THE RECORD" prevents transcription system 300 from including the user's statement immediately following "OFF THE RECORD" in the transcript, when create transcription 420 has been executed. The key words "END TRANSCRIPT" causes transcription system 300 to cease creating a transcript.

Selecting view conference transcript list command 430 triggers the execution of transcription system 300 (for example via interface module 310). In some embodiments, the view conference transcript list command 430 is not displayed unless there is at least one conference record stored in memory (for example, data storage module 350). View conference transcript list command 430 can be executed before, during, or after mobile device 130 participates in the conference call. Referring back to FIG. 3, when activated, view conference transcript list command 430 causes transcription system 300 to access interface module 310 and data storage module 350.

Interface module 310 can display a list of previously transcribed conferences. For example, interface module 310 enables the user to view one or more conference records. A conference record can include a partial or complete transcript. A transcript can include audio recordings of the conference, video recordings of the conference, textual representation of the conference, or some combination thereof. A partial transcript corresponds to transcribed statements made by a particular user during a particular conference. For example, a partial transcript could be a statement from the mobile device user made during the conference. Each partial transcript created on a mobile device corresponds to statements made using transcription system 300 operating on that device. Accordingly, during the course of a conference, each participating mobile device can have a plurality of partial transcripts that are associated with the user of that device. When the plurality of partial transcripts from each device are collected and arranged in chronological order, a complete transcript is created.

FIG. 5 illustrates an example conference transcript list graphical user interface (GUI) 500 generated by transcription system 300 (for example, by interface module 310), displaying a plurality of conference records 510, 520, and 530. Conference records 510, 520, and 530 can be sorted and grouped according to specific features of conference records 510, 520, and 530. For example, specific features can include the date the conference occurred, the time the conference occurred, the content of the conference, the type of transcript (for example, partial, complete, audio, text, etc.), or any combination thereof. For example, conference records 510, 520, and 530 are grouped by date to form groups 540 and 550, and then displayed to the user. Conference records 510, 520, and 530 that occur on the same day can additionally be ordered by the time the conference occurred.

Additionally, each conference record 510, 520, and 530 can display one or more indicators associated with their specific features. An indicator can be text icon, an audio icon, or a video icon that is associated with an entry in a particular conference record. Additionally, in some embodiments the icons can cause the execution of associated files.

Audio icon 560 is an indicator that is displayed when an audio speech file is available as part of the conference record. In some embodiments, audio icon 560 is an executable, which when executed by the user, begins playback of the speech audio file associated with audio icon 560. Additionally, a video icon (not shown) is an indicator that is displayed when the speech audio file has available video content or has an associated video file available as part of the conference record. In some embodiments, the video icon is an executable, which when executed by the user, begins playback of video content associated with the speech audio file that is associated with the video icon.

Conference records 510 and 520 contain linked partial transcripts, and a linked complete transcript, respectively. A linked transcript (partial or complete) has portions of the transcript mapped to corresponding speech audio files. Additionally, in some embodiments, if the conference is a video conference, the linked transcript (partial or complete) has portions of the transcript mapped to corresponding video content associated with the speech audio files. For example, if a portion of a linked transcript reads "the sky is blue," when a user selects the associated audio icon 560, transcription system 300 automatically plays back the speech audio file mapped to that portion of the linked transcript, or "the sky is blue." This can be useful if an error occurred in the speech-to-text conversion creating, for example, a nonsensical comment in the linked transcript. The user can simply click on audio icon 560 and transcription system 300 automatically plays the associated speech audio file associated with the transcript, thus providing a backup to the user in the event of improper speech-to-text conversion.

Text icon 562 is displayed when the complete or partial transcript is available as part of the conference record. For example, conference record 510 corresponds to "Conf: 1" and contains two individual entries. Both individual entries contain linked partial transcripts and interface module 310 conveys this information to the user by displaying audio icon 560 and a corresponding text icon 562. In contrast, conference record 530 does not display an audio icon 560, but does display a text icon 562. Thus, in conference record 530 the transcript of the conference only contains text.

In some embodiments transcription system 300 allows the user to delete the entire conference record or selectively delete portions thereof. For example, if the conference record includes a linked transcript, the user can delete a speech audio file but keep the associated text, or vice-versa. Additionally, in some embodiments, transcription system 300 is automatically configured to remove the speech audio files after a predetermined condition is met. Example conditions include reaching a data storage threshold, successful transcript creation, a predetermined amount of time has passed since the conference occurred, or any combination thereof. Additionally, in some embodiments, the user can configure the predetermined conditions.

In some embodiments, text icon 562 can contain a link that opens the stored transcript information. For example, in conference record 520 only "Transcript" is displayed in text icon 562. In this embodiment, when a user selects "Transcript", transcription module 300 links to the corresponding conference record window as illustrated in FIG. 6.

FIG. 6 illustrates an example conference record graphical user interface (GUI) 600. Interface module 310 displays conference record GUI 600 when text icon 562 is selected. In this example, conference record GUI 600 corresponds to conference record 520. The selection of text icon 562 associated with a particular conference record can open a conference record GUI 600 that corresponds to conference record 520. Conference record GUI 600 includes one or more individual transcriptions (610) that are arranged in the correct chronological order. Additionally, each individual entry contains an identifier 620 associated with the speaker of the individual transcription. In some embodiments identifier 620 can link to contact information of the speaker corresponding to identifier 620. Conference record 520 includes a complete linked transcript, accordingly, one or more of the individual entries can be mapped to their respective speech audio files. In this embodiment, the presence of an associated speech audio file is indicated by the text of the individual entry being underlined. Such that a user can select the text causing the automatic execution of the associated speech data file. In some embodiments, the user can correct or update the text in case a transcription error occurred. In other embodiments not shown one or more audio icons can be displayed that when executed cause the automatic execution of the associated speech data file. In other embodiments not shown one or more video icons can be displayed that, when executed, cause the automatic execution of a video component associated with the speech data file.

Referring back to FIG. 3, interface module 310 can be coupled to speech-to-text module 320, communication module 330, control module 340, and data storage module 350.

Speech-to-text module 320 is configured to convert a received speech audio file into text to create a partial transcript. Speech-to-text module 320 also associates the date/time stamp, the conference identifier, and the speaker identifier corresponding to the received speech audio file with the newly created partial transcript. Speech-to-text module 320 can be located on each mobile device, one or more servers, or some combination thereof.

In some embodiments, speech-to-text module 320 additionally includes a voice recognition feature. The voice recognition feature can be useful when two or more parties are participating in the conference using the same mobile device. Speech-to-text module 320 can then identify the speaker of a received speech audio data file using one or more voice templates stored in data storage module 350. If speech-to-text module 320 identifies more than one speaker, the multiple speaker identifiers are associated with the partial transcript. In some embodiments when two or more parties are participating in the conference using the same mobile device, the partial transcript is also further broken down into a plurality of partial transcripts that each contain only one speaker. For example, if the speech audio file, when played, says "Jack can you explain option B (voice 1). Sure, however, first we need to understand option A (voice 2)," instead of a single partial transcript, speech-to-text module 320 can create two partial transcripts, one with a speaker identifier corresponding to voice 1 and a separate partial transcript with a speaker identifier corresponding to voice 2.

Additionally, in some embodiments speech-to-text module 320 is able to convert and translate the received speech audio file into one or more different languages using portions of a speech-to-text database stored in data storage module 350. For example, if the received speech audio file is in Chinese, the speech-to-text module 320 can produce a partial transcript in English. Additionally, in some embodiments, speech-to-text module 320 can produce multiple partial transcripts in different languages (e.g., Chinese and English) from the received speech audio file.

Communication module 330 is configured to join the mobile device with one or more mobile devices participating in the conference. The conference can be hosted on a variety of conference hosing systems. For example, communication module 330 can join the mobile device to conference hosted using a mobile bridge, a PBX, a conference bridge, or any combination thereof. Additionally, communication module 330 can transmit speech audio files, partial transcripts, complete transcripts, voice templates, portions or all of a speech-to-text database, or any combination thereof. Communication module 330 is configured to transmit data via enterprise network 105, PLMN 120, WAN 115, or some combination thereof, to one or more mobile devices (for example, mobile devices 130, 135, 136, and 140), a server (for example, SMP 165), digital phones (for example digital phone 160), one or more computers (for example computers 142 and 143), or some combination thereof. Additionally, in some embodiments communication module 330 establishes a peer-to-peer connection with one or more mobile devices to transmit speech audio files, partial or complete transcripts, partial or complete linked transcripts, or any combination thereof, to the one or more mobile devices. Communication module 330 can be coupled to interface module 310, speech-to-text module 320, control module 340, and data storage module 350.

Control module 340 is configured to monitor the mobile device microphone for the user's speech in a conference. Control module 340 can be located on each mobile device, on one or more central servers, or some combination thereof. Control module 340 records any detected user speech in an individual speech audio file. Additionally, in video conferences, control module 340 can record a video signal using, for example, one or more cameras, and associate the video component with the corresponding speech audio file. Each speech audio file is date and time stamped and associated with the conference. The speech audio files can be stored in data storage module 350. In some embodiments, immediately after a speech audio file is created, it is passed to speech-to-text module 320 for conversion into a partial transcript. Control module 340 is configured to map received partial transcripts to their respective speech audio files to create a partial linked transcript. Control module 340 is configured to arrange one or more partial transcripts in chronological order using the date/time stamps of each partial transcript. Additionally, in some embodiments control module 340 is configured to acquire all of the partial transcripts of the conference participants and assemble them in chronological order to create a complete transcript. In some embodiments, control module 340 then distributes the complete transcript to one or more of the conference participants. In some embodiments, control module 340 for each participating mobile device can synchronize itself with a conference bridge 132 so that the date/time stamp across each is consistent. This allows control module 340 to assemble the multiple partial transcripts in chronological order. In some embodiments, control module 340 can assemble the multiple partial transcripts in chronological order based on the content in the partial transcripts.

In one embodiment, control module 340 assembles at a server each of the partial transcripts into a complete transcript and then distributes the complete transcript to individual mobile devices participating in the conference.

In alternate embodiments, control module 340 operating on the mobile device (for example, mobile device 130) creates one or more partial transcripts associated with the user of the mobile device. Each mobile device participating in the conference (for example, mobile devices 135, 136, and 140) can have its own control module 340 that similarly creates one or more partial transcripts associated with the users of those devices. The partial transcripts are then distributed among the mobile devices, where each mobile device adds its own partial transcripts, if any, to the received partial transcripts until a complete transcript is formed. The method of distribution of the one or more partial transcripts can be a serial. In a serial distribution the mobile devices sends its one or more partial transcripts to a second mobile device participating in the conference. This second mobile device then adds its partial transcripts, if any, to the received partial transcripts to create an augmented partial transcript. The augmented partial transcript is then sent to a third mobile device participating in the conference and the process is repeated, until a complete transcript is formed. A complete transcript is formed when it includes all of the partial transcripts from each mobile device participating in the conference. In some embodiments, the mobile device can receive partial transcripts from each mobile device participating in the conference and use the received partial transcripts to form a complete transcript. The mobile device can then distribute the complete transcript to one or more mobile devices participating in the conference. In some embodiments, control module 340 can calculate a transmission geometry that minimizes the number of transmissions between mobile devices to create a complete transcript. Additionally, control module 340 can calculate a transmission geometry that minimizes the time to create a complete transcript. The control module 340 on the mobile device where the linked complete transcript is formed then distributes the linked complete transcript to one or more mobile devices that participated in the conference. Control module 340 can be coupled to interface module 310, speech-to-text module 320, communication module 330, and data storage module 350.

Data storage module 350 can also include a database, one or more computer files in a directory structure, or any other appropriate data storage mechanism such as a memory. Additionally, in some embodiments, data storage module 350 stores user profile information, including, one or more conference dial in telephone numbers. Data storage module 350 can also store speech audio files (and any associated video component), partial transcripts, complete transcripts, speaker identifiers, conference identifiers, one or more voice templates, a speech-to-text database, translation database, or any combination thereof. Additionally, data storage module 350 can store a language preference. The language preference can be useful when transcription system 300 is capable of creating partial transcripts in different languages. Data storage module 350 also stores information relating to various people, for example, name, place of employment, work phone number, home address, etc. In some example embodiments, data storage module 350 is distributed across one or more network servers. Data storage module 350 can communicate with interface module 310, speech-to-text module 320, communication module 330, and control module 340.

Each of modules 310, 320, 330, and 340 can be software programs stored in a RAM, a ROM, a PROM, a FPROM, or other dynamic storage devices, or persistent memory for storing information and instructions.

Figure 7:
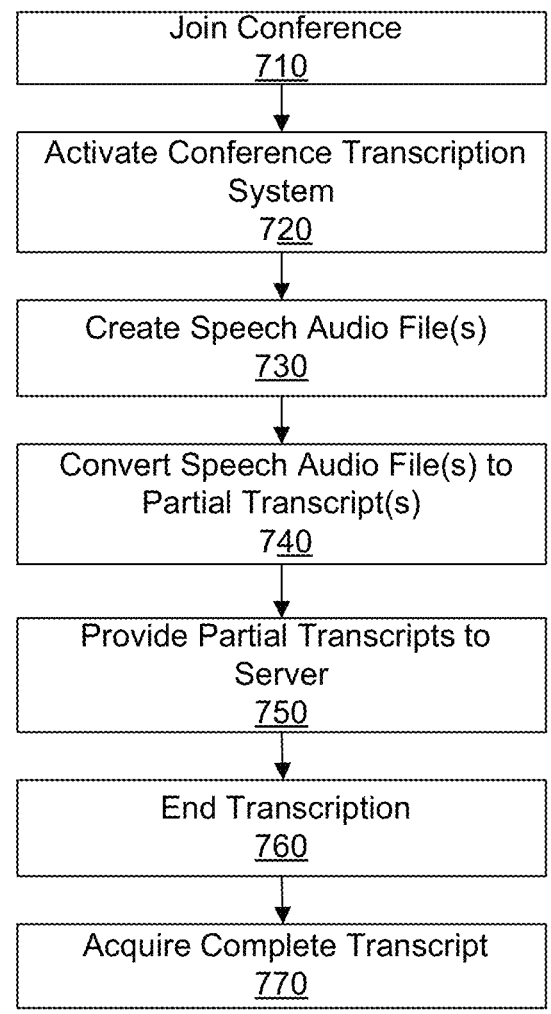
FIG. 7 shows a flowchart representing an example method transcribing conference data that utilizes a central server.

FIG. 7 is a flowchart representing an example method transcribing conference data that utilizes a central server. While the flowchart discloses the following steps in a particular order, it is appreciated that at least some of the steps can be moved, modified, or deleted where appropriate.

In step 710, a mobile device joins a conference (audio, video, or some combination thereof). In some embodiments the mobile device is a moderator device. The moderator device is used by the moderator of the conference. In step 720, a transcription system is activated. The transcription system can be activated via a menu command, a voice command, an actual button on the organizing device, or some combination thereof.

In some embodiments, when activated, the transcription system automatically creates speech audio files of any speech detected at the microphone of the mobile device while it participates in the conference. In other embodiments, when activated, the transcription system automatically creates speech audio files in response to specific key words said by the user. For example, if the user says "ACTION ITEM Jim's letter to counsel needs to be revised," the transcription system would then create a speech audio file containing a recording of "Jim's letter to counsel needs to be revised." Key words can include, action item, create transcript, off the record, end transcript, etc. In some embodiments, if the conference is a video conference, the transcription system can also record a video component that is associated with the created speech audio files.

The key words "action item" can cause the transcription system to create a speech audio file of the user's statement immediately following the key word. The key words "create transcript" cause the transcription system to automatically create speech audio files for any speech detected at the microphone of the mobile device while it participates in the conference. When operating in the "create transcript" mode of operation, if the transcription system detects the key words "off the record," it does not record the user's statement immediately following "off the record." When the transcription system detects key words "end transcript," it terminates creating the "create transcript" mode of operation.

In step 730, the transcription system starts recording after it detects the user speaking and ceases recording after no speech is detected for a predetermined time, and stores the recorded speech, creating a speech audio file. Additionally, if the conference is a video conference, the transcription system can also record a video component that is associated with the created speech audio files. Each speech audio file is date/time stamped, contains a conference identifier, and contains a speaker identifier. Additionally, in some embodiments (not shown) transcription system performs the additional step of voice recognition on one or more speech audio files.

In step 740, the transcription system performs speech-to-text conversion on one or more speech audio files to create one or more partial transcripts. Each partial transcript has an associated date/time stamp, conference identifier, and speaker identifier from the corresponding speech audio data file. The speech-to-text conversion occurs contemporaneously and independent from speech-to-text conversion that can occur on other devices participating in the conference. Additionally, in some embodiments (not shown) transcription system converts and translates the received speech audio file(s) into one or more different languages. For example, if the received speech audio file is in Chinese, transcription system can produce a partial transcript in English where appropriate. Similarly, in some embodiments, transcription system produces multiple partial transcripts in different languages (e.g., Chinese and English) from the received speech audio file.

In some embodiments not shown, the transcription system additionally links the one or more partial transcripts with their corresponding speech audio file.

In step 750, transcription system provides one or more partial transcripts to a server (for example, SMP 165). In embodiments where the partial transcript is linked, the transcription system also sends the associated speech audio files to the server. In embodiments where the partial transcript is linked and the conference is a video conference, the transcription system also sends the associated video component of the speech audio files to the server. In step 760, the transcription system terminates the transcription service. This occurs, for example, when the user terminates the transcription service with an audio command or terminates the voice conference connection.

In step 770, the mobile device acquires a complete transcript from the central server.

Figure 8:
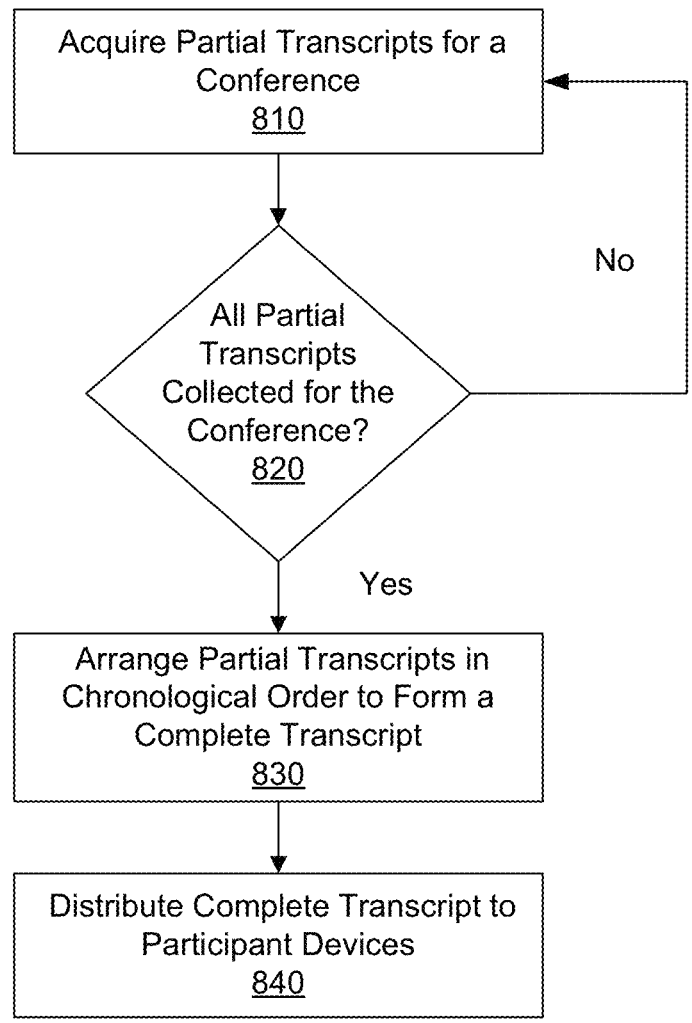
FIG. 8 shows a flowchart representing an example method for assembling a complete transcript from one or more partial transcripts by a central server.

FIG. 8 is a flowchart representing an example method for assembling a complete transcript from one or more partial transcripts by a central server. While the flowchart discloses the following steps in a particular order, it is appreciated that at least some of the steps can be moved, modified, or deleted where appropriate.

In step 810, a transcription system operating on a server (for example, SMP 165) acquires one or more partial transcripts from a plurality of mobile devices participating in a conference. If the acquired transcripts are linked transcripts, the transcription system also acquires the speech audio files that correspond to the one or more partial transcripts. Each received partial transcript includes a date/time stamp, a conference identifier, and a speaker identifier. Additionally, in some embodiments, if the conference is a video conference and the acquired transcripts are linked transcripts, the transcription system also acquires the associated video component of the speech audio files that correspond to the one or more partial transcripts.

In step 820, the transcription system determines whether all partial transcripts have been collected from the mobile devices participating in the conference. If the transcription system determines that there are still some remaining partial transcripts to be collected, the system continues to acquire partial transcripts (step 810). If the transcription system determines that all the partial transcripts have been collected, it proceeds to step 830.

In step 830, the transcription system arranges the collected partial transcripts in chronological order to form a complete transcript. The transcription system first groups the partial transcripts by conference (not shown) using the conference identifiers of the received partial transcripts. Then using the date/time stamp of each partial transcript, with the correct conference group, arranges them in chronological order. Once the partial transcripts are arranged, the transcription system aggregates the plurality of partial transcripts into a single complete transcript. In some embodiments, at least some of the aggregated partial transcripts are linked partial transcripts, and are aggregated into a single complete linked conference.

In some embodiments, each participating mobile device synchronizes itself with a conference bridge so that the date/time stamp across each is consistent. This allows the transcription system to assemble the multiple partial transcripts in chronological order. In some embodiments, the transcription system assembles the multiple partial transcripts in chronological order based on the content in the partial transcripts.

Additionally, in some embodiments not shown, if the grouped (by conference) partial transcripts contain different languages, the transcription system performs the additional step of grouping the partial transcripts by language before arranging the partial transcripts in chronological order. In this embodiment, there is a single complete transcript that corresponds to each of the grouped languages.

Finally, in step 840, the transcription system distributes the complete transcripts to one or more mobile devices participating in the conference.

FIG. 9 is a flowchart representing an example method transcribing conference data that shares transcript processing among conference devices. While the flowchart discloses the following steps in a particular order, it is appreciated that at least some of the steps can be moved, modified, or deleted where appropriate.

In step 905, a mobile device joins a conference. In some embodiments the mobile device is the conference moderator. In step 910, a transcription system is activated. The transcription system can be activated via a menu command, a voice command, an actual button on the organizing device, or some combination thereof.

In some embodiments, when activated, transcription system automatically creates speech audio files of any speech detected at the microphone of the mobile device while it participates in the conference.

In step 915, the transcription system starts recording after it detects the user speaking and ceases recording after no speech is detected for a predetermined time, and stores the recorded speech, creating a speech audio file. Each speech audio file created has a date/time stamp, a conference identifier, and a speaker identifier. The date/time stamp provides the date and time when the speech audio file was created. The conference identifier associates the speech audio file to its corresponding conference. The speaker identifier associates the speech audio file with the speaker. The speaker identifier can be the name of a user, a user's identifier (user name, email address, or any other identifier), work phone number, etc. In some embodiments, if the conference is a video conference, the transcription system also records a video component that corresponds to the created speech audio file.

Additionally, in some embodiments (not shown) the transcription system performs the additional step of voice recognition on one or more speech audio files. This can be useful when multiple parties are participating in the conference using the same device. The transcription system then associates a speaker identifier for each speaker.

In step 920, the transcription system performs speech-to-text conversion on one or more speech audio files to create one or more partial transcripts. Each partial transcript has an associated date/time stamp, conference identifier, and speaker identifier from the corresponding speech audio data file. The speech-to-text conversion occurs contemporaneously and independent from speech-to-text conversion that can occur on other devices participating in the conference. Additionally, in some embodiments (not shown), transcription system converts and translates the received speech audio file(s) into one or more different languages. For example, if the received speech audio file is in Chinese, the transcription system can produce a partial transcript in English where appropriate. Similarly, in some embodiments, the transcription system produces multiple partial transcripts in different languages (e.g., Chinese and English) from the received speech audio file.

In some embodiments not shown, the transcription system links the one or more partial transcripts with their corresponding speech audio file. Each linked partial transcript has an associated date/time stamp, conference identifier, and speaker identifier. In some embodiments, if the conference is a video conference, the transcription system links the one or more partial transcripts with the video component associated with the corresponding speech audio file.

In step 925, the transcription system terminates the transcription service. This occurs, for example, when the user terminates the transcription service with an audio command or terminates the voice conference connection.

In step 930, the transcription system determines whether the mobile device is a designated device. The designated device can the moderator device, an organizing device, or any other device participating in the conference. The moderator device is the device acting as the conference moderator. The organizing device is the device that initially established the conference. If the mobile device is the designated device, the transcription system automatically calculates a transmission geometry that minimizes the number of transmissions between mobile devices to create a complete transcript. Additionally, the transcription system calculates a transmission geometry to minimize the time needed to create a complete transcript (step 935). The transcription system then forms distribution instructions based on the transmission geometry. The distribution instructions provide mobile device conference participants with instructions regarding where to send their partial transcripts.

In step 940, the transcription system sends the one or more partial transcripts resident on the designated device and the calculated distribution instructions to one or more mobile devices participating in the conference, in accordance with the distribution instructions. In embodiments where the partial transcripts are linked, the mobile device also sends one or more speech audio files that correspond to the one or more partial transcripts.

In step 945, the designated device acquires a complete transcript from one of the mobile devices participating in the conference and in step 950 the process ends.

Referring back to step 930, if the transcription system determines that mobile device is not the designated device, the mobile device acquires one or more partial transcripts and distribution instructions from another mobile device participating in the conference (step 955). In embodiments where the partial transcripts are linked, the mobile device also receives one or more speech audio files that correspond to the one or more partial transcripts.

In step 960, the transcription system incorporates the received one or more partial transcripts with any local partial transcripts generated by the mobile device during the conference. Step 960 includes comparing the conference identifiers of the received one or more partial transcripts to the conference identifiers of the local partial transcripts. The transcription system then groups the received one or more partial transcripts with any local partial transcripts containing the same conference identifier. The transcription system then orders the grouped partial transcripts in chronological order using the date/time stamps of the grouped partial transcripts.

In step 965, the transcription system determines whether the arranged one or more partial transcripts constitute a complete transcript. A complete transcript can be formed when all partial transcripts from each mobile device participating in the conference have been acquired. If all partial transcripts from mobile devices participating in the conference have been acquired, in a step not shown the transcription system automatically aggregates the plurality of partial transcripts into a single complete transcript. In some embodiments, at least some of the aggregated partial transcripts are linked partial transcripts, and are aggregated into a single complete linked conference. In some embodiments, the corresponding speech audio files are embedded in the linked complete transcript. If the conference is complete, in step 970 the transcription system transmits the complete transcript to one or more mobile devices that participated in the conference and the process ends (step 950). In some embodiments, if the complete transcript is linked, transcription system also sends one or more corresponding speech audio files. In other embodiments, the speech audio files are embedded within the received transcript. Additionally, in some embodiments, if the conference is a video conference and the transcription system is linked, the transcription system also sends the video component associated with the one or more corresponding speech audio files.

Alternatively, if a complete transcript is not formed, in step 975 transcription system sends the grouped and ordered partial transcripts and the received distribution instructions to one or more mobile devices participating in the conference, in accordance with the received distribution instructions. In embodiments, where the partial transcripts are linked, the mobile device also sends one or more speech audio files that correspond to the one or more partial transcripts.

In step 980, the mobile device acquires a complete transcript from one of the mobile devices participating in the conference, and the process then ends (step 950). In some embodiments, if the complete transcript is linked, transcription system also acquires one or more corresponding speech audio files. In other embodiments, the speech audio files are embedded within the received transcript. Additionally, in some embodiments, if the conference is a video conference and the transcription system is linked, the transcription system also acquires the video component associated with the one or more corresponding speech audio files.

Certain adaptations and modifications of the described embodiments can be made. Therefore, the above discussed embodiments are considered to be illustrative and not restrictive.

Embodiments of the present application are not limited to any particular operating system, mobile device architecture, server architecture, or computer programming language.

What is claimed is:
1. A method comprising:
 joining an audio conference call with a device associated with a participant, of a plurality of participants joined to the conference through one or more associated devices;

creating a speech audio file of a portion of the conference detected by a microphone of the device receiving local audio of the participant;

converting contemporaneously, at the device, the speech audio file to a local partial transcript of the portion of the conference detected by the microphone;

acquiring, by the device, a plurality of remote partial transcripts of the conference from at least one of the associated devices;

aggregating, by the device, the local partial transcript and the plurality of remote partial transcripts into an augmented transcript; and providing, by the device, the augmented transcript to the one or more associated devices.

2. The method of claim 1, further comprising:
providing the local partial transcript to at least one of the associated devices.

3. The method of claim 1, wherein the acquired plurality of remote partial transcripts and the local partial transcript include an associated date/time stamp, a speaker identifier, and a conference identifier.

4. The method of claim 3, wherein aggregating further comprises:
grouping the acquired plurality of remote partial transcripts and the local partial transcript by conference identifier;
arranging the grouped partial transcripts in chronological order using their date/time stamps.

5. The method of claim 1, wherein the local partial transcript is a linked transcript, and the augmented transcript is a linked transcript.

6. The method of claim 5, wherein the linked augmented transcript includes an audio icon associated a portion of the linked augmented transcript and a corresponding speech audio file, such that when the audio icon is selected the device plays the corresponding speech audio file.

7. The method of claim 1, wherein a complete transcript is formed when the augmented transcript includes the local partial transcript and remote partial transcripts from each associated device.

8. A non-transitory computer-readable medium comprising instructions that are executable by a device to cause the device to perform a method, the method comprising:
joining an audio conference call with the device associated with a participant, of a plurality of participants joined to the conference through one or more associated devices;
creating a speech audio file of a portion of the conference detected by a microphone of the device receiving local audio of the participant;
converting contemporaneously, at the device, the speech audio file to a local partial transcript of the portion of the conference detected by the microphone; and
acquiring a plurality of remote partial transcripts of the conference from at least one of the associated devices;
aggregating, the local partial transcript and the plurality of remote partial transcripts into an augmented transcript; and
providing the augmented transcript to the one or more associated devices.

9. The computer readable medium of claim 8, further comprising:
providing the local partial transcript to at least one of the associated devices.

10. The computer readable medium of claim 8, wherein the acquired plurality of remote partial transcripts and the local partial transcript include an associated date/time stamp, a speaker identifier, and conference identifier.

11. The computer readable medium of claim 10, wherein aggregating further comprises:
grouping the acquired plurality of remote partial transcripts and the local partial transcript by conference identifier;
arranging the grouped partial transcripts in chronological order using their date/time stamps.

12. The computer readable medium of claim 8, wherein the local partial transcript is a linked transcript, and the augmented transcript is a linked transcript.

13. The computer readable medium of claim 12, wherein the linked augmented transcript includes an audio icon associated with a portion of the linked augmented transcript and a corresponding speech audio file, such that when the audio icon is selected the device plays the corresponding speech audio file.

14. The computer-readable medium of claim 8, wherein a complete transcript is formed when the augmented transcript includes the local partial transcript and remote partial transcripts from each associated device.

15. A device for facilitating the creation of a transcript of an audio conference call, comprising:
one or more processors configured to execute modules; and
a memory storing the modules, the modules comprising:
a communication module configured to join the audio conference call, wherein a participant is of a plurality of participants joined to the conference through one or more associated devices,
an interface module configured to create a speech audio file of a portion of the conference detected by a microphone of the device receiving local audio of the participant,
a speech-to-text module configured to convert contemporaneously, at the device, the speech audio file to a local partial transcript of the portion of the conference detected by the microphone; and
a control module configured to acquire a plurality of remote partial transcripts of the conference from at least one of the associated devices, aggregate the local partial transcript and the plurality of remote partial transcripts into an augmented transcript, and provide the augmented transcript to the one or more associated devices.

16. The device of claim 15, wherein the control module is further configured to provide the local partial transcript to at least one of the associated devices.

17. The device of claim 15, wherein the acquired plurality of remote partial transcripts and the local partial transcript include an associated date/time stamp, a speaker identifier, and a conference identifier.

18. The device of claim 17, wherein the control module is further configured to:
group the acquired plurality of remote partial transcripts and the local partial transcript by conference identifier;
arrange the grouped partial transcripts in chronological order using their date/time stamps.

19. The device of claim 15, wherein the local partial transcript is a linked transcript, and the augmented transcript is a linked transcript.

20. The device of claim 15, wherein a complete transcript is formed when the augmented transcript includes the local partial transcript and remote partial transcripts from each associated device.

* * * * *